Jan. 6, 1942.  W. MULLER  2,268,612
FOLLOW-UP DEVICE
Filed Oct. 10, 1938  3 Sheets-Sheet 1

Inventor:
Wolfgang Muller
By A. D. Adams
Attorney

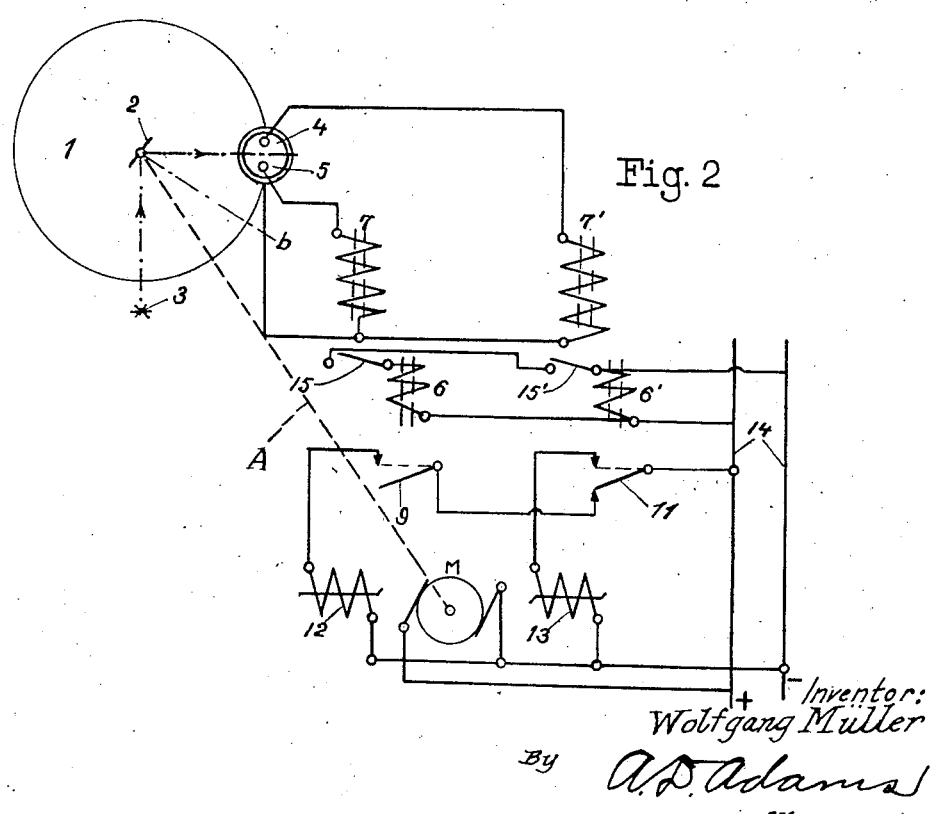

Jan. 6, 1942.                W. MULLER                  2,268,612
                           FOLLOW-UP DEVICE
              Filed Oct. 10, 1938              3 Sheets-Sheet 3

Inventor:
Wolfgang Müller
By A. D. Adams
Attorney

Patented Jan. 6, 1942

2,268,612

UNITED STATES PATENT OFFICE 2,268,612

FOLLOW-UP DEVICE

Wolfgang Müller, Neu-Strelitz, Germany, assignor to Askania-Werke A. G., a corporation of Germany Application October 10, 1938, Serial No. 234,328
In Germany October 11, 1937

3 Claims. (Cl. 172—239)

The present invention relates to a follow-up device comprising two elements which are jointly turnable and a single element independently movable in opposite sense for cooperating either with the one or the other of said two elements, thereby closing or interrupting, respectively, for each direction of movement an electrical circuit. Each circuit sets means into operation which effect the follow-up movement of said two elements relative to said single movable element in one or the other sense till the two elements are acted upon by the single element to form a neutral position in which the follow-up movement is zero. In remote control compasses, for instance one has covered to a different degree by means of a compass card, half of which is transparent, the light path of two diametrically arranged and jointly turnable light or temperature sensitive elements in dependency on the turning of the compass card and and one has moved the element in accordance with the movement of the compass card until both elements are again equally covered by the compass card. This position is the neutral position in which the follow-up movement is zero. But these systems have the disadvantage that due to the semicircular form of the diaphragm, respectively the compass card acting as diaphragm, it is possible to cover equally the light or temperature sensitive elements in two positions displaced by 180°. In case the diaphragm rotates, its controlling edges touch both elements twice. Therefore, an exactness of the remote transmission of the position is not always guaranteed. Especially in case the arrangement is set ready for operation it may happen that the elements take up a position displaced by 180° as compared with the normal position, inconvenient readjustments of the system becoming necessary.

In order to avoid the disadvantage of the well-known follow-up devices, according to the invention, means are provided for closing in the position displaced about 180° from the neutral position an electrical circuit determined to cause a follow-up movement of said two elements relative to said single element and till the neutral position is reached. By this means every error is avoided during the exploring.

The subject matter of the invention is more fully explained by means of the illustrated embodiments.

Figs. 1a and 2 show two modifications of Fig. 1.

Figure 1:
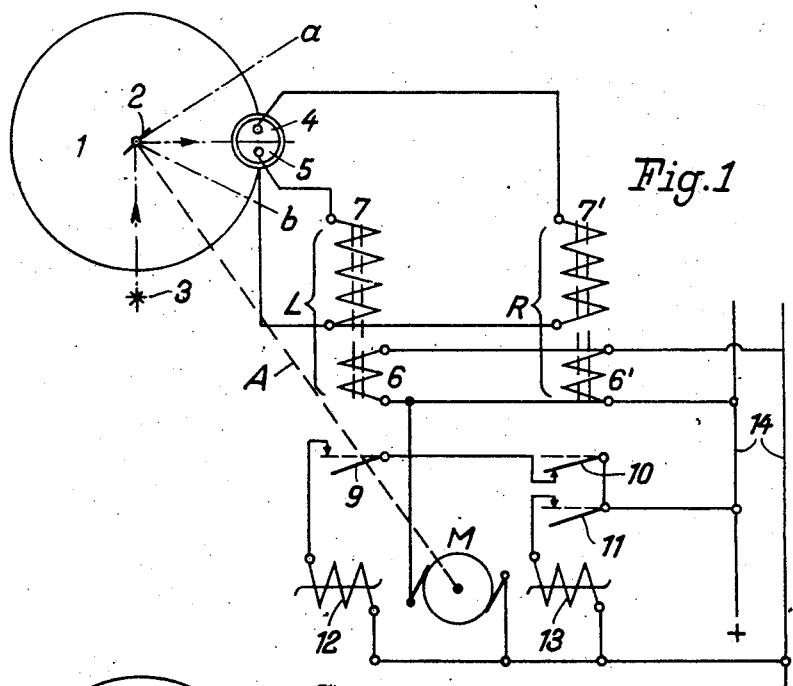
Fig. 1 shows a complete wiring of the follow-up device according to the invention for remote control compasses.

The compass magnet system, not illustrated, supports a one-sided reflecting surface 2, Fig. 1, which deflects the ray bundle sent out by an incandescent lamp 3, in accordance with the turning of the compass, so that the ray bundle falls within a certain turning range on the two photo-cells 4, 5 lying next to one another, which are arranged on the turnable disk 1. The two photo-cells feed one winding each 7, 7' of two relays R, L destined for the left turn (L) and one for the right turn (R). The two relays possess one auxiliary winding each 6, 6', which are continuously excited by the network 14. Each of the two windings 7, 7' operate in their effect in opposition to the two windings 6, 6'. The two windings 6, 7 and 6', 7' form therefore one differential relay each with the open circuit windings 7, 7' and the closed circuit windings 6, 6'. The relay 6, 7 actuates an armature 9 constructed as contact, whilst the relay 6', 7' actuates its armature together with two contacts 10, 11. 12 and 13 are the exciting coil systems of a follow-up motor M effecting the follow-up movement of the disk carrying the photo-cells 4, 5, as indicated by a dotted line A; said motor changes its direction of rotation depending on whether the exciting coil system 12 or the exciting coil system 13 is excited. In accordance with the direction of rotation of the follow-up system the photo elements 4, 5 are continuously following up the deflection of the ray of light. The contacts 9, 10 lie in the controlling circuit of the winding 12, whilst the contact 11 lies in the circuit of the winding 13. In case of drawn up relay armatures the contacts 9 and 11 are closed, whilst the contact 10 is opened. The position is illustrated in Fig. 1 by dotted lines. On the other hand in case of fallen off relay armatures the contacts 9 and 11 are opened, whilst the contact 10 is closed. This position of the contacts is illustrated in Fig. 1 by means of solid lines.

The mode of operation of the explained arrangement is the following:

Firstly the case should be regarded, in which the bundle of light deflected by the mirror 2 has entirely wandered away from the photo-cells 4, 5 in the one or the other direction. The position of the deflected bundle of light may be illustrated by the position $a$, respectively $b$. In this case the photo-elements give no current, so that the windings 7, 7' are not excited. Due to the permanent exciting of the windings 6, 6' the corresponding relay armatures are drawn up. Accordingly, the switches 9, 10, 11 have the position illustrated in the drawings with dotted lines. In this case only the controlling winding 13 of the follow-up system is excited, which sets the disk 1 supporting the photo-elements 4, 5 so long in motion in the same direction of rotation until the two photo-cells are equally exposed. Now the two relay windings 7, 7' are equally excited. As the exciting of the two windings 7, 7' weakens the exciting of the two closed circuit current windings 6, 6', then in this position of the photo-cells 4, 5 both relay armatures fall off. In this case the contacts 9, 10, 11 take up the position shown in solid lines in the drawings; in this position the controlling circuit of the windings 12, 13 is interrupted. Accordingly, the follow-up system is stationary in this position. If the ray of light wanders out in the one or the other direction, whereby be supposed that in case of this deflection of the ray of light at least one of the two photo-cells remains illuminated, then one of the two open circuit windings 7, 7' remains excited. This results in a falling off of the corresponding armature, whilst the armature of the other relay is drawn up. A consideration of the illustrated wiring shows that in this case either the controlling winding 12 or the winding 13 of the follow-up system is switched on so that the disk 1 is brought to follow-up in the one or the other direction of rotation so long until the exposure symmetry of the two photo-elements is achieved. In the above described arrangement an error in the remote transmission of the position cannot happen.

Figure 1A:
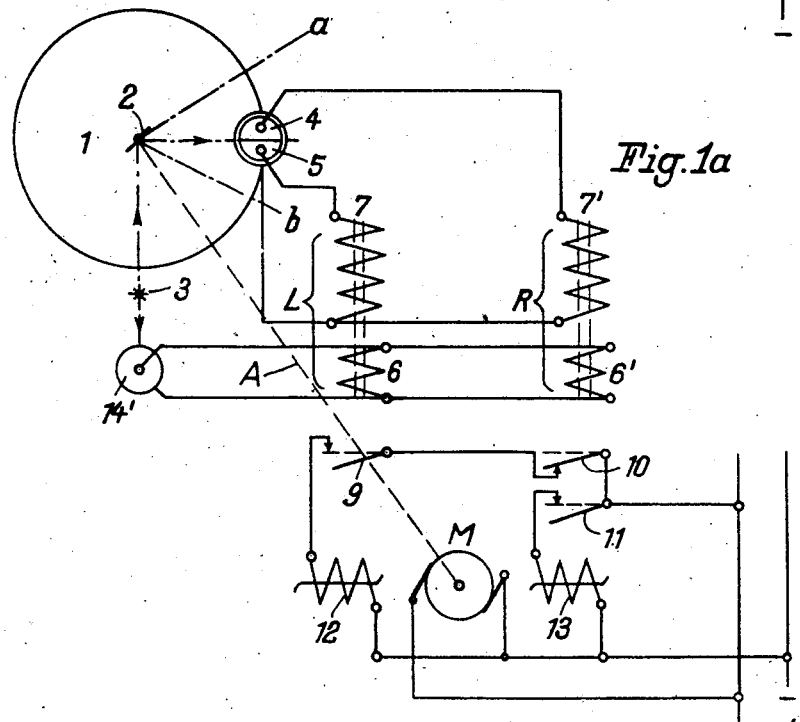

The closed circuit current windings 6, 6' can also be continuously excited in place of the network 14 by a photo-element 14' (as is illustrated in Fig. 1a), which is radiated upon by the same source 3 of rays which influences the photo-elements 4, 5 exciting the open circuit windings 7, 7'. The arrangement has the advantage that also in case of fluctuations of the luminous intensity of the lamp 3 the magnetic fluxes of the open circuit windings 7, 7' and the closed circuit current windings 6, 6' are always of the same size so that also in case of fluctuations of the luminous intensity of the lamp 3 the attracting effect of the closed circuit current windings is compensated by the open circuit windings.

One can also make the arrangement according to Fig. 2 so that the open circuit windings 7, 7' open, respectively close one each of the contacts 15, 15' lying in the exciting circuit of the closed circuit current windings 6, 6'. The manner of this arrangement is then similar to that illustrated in Fig. 1 so that in case of a non-excited condition of the open circuit windings 7, 7' the contacts 15, 15' are closed. Therefore the open circuit current windings 6, 6' can draw up the corresponding relay armatures, whilst in case of the exciting of one or both open circuit windings 7, 7' the contacts 15, 15' are opened so that in this case the corresponding relay armatures drop off.

In Fig. 2 the contact arrangement in the controlling circuits of the follow-up system has been simplified in the sense that the contact 11 takes over at the same time the function of the former auxiliary contact 10. This is achieved thereby that the tongue acts as commutator, switching on in its one position the controlling winding 13 and interrupting at the same time the current circuit in which the controlling winding 12 lies.

The photo-elements 4, 5 may be such of any convenient type. They may be such which give under the influence of light or heat rays a current corresponding to the intensity of these rays. For instance in place of the photo-elements thermo-couples or bolometer arrangements, also mechanical contact arrangements can be used.

Figure 3:
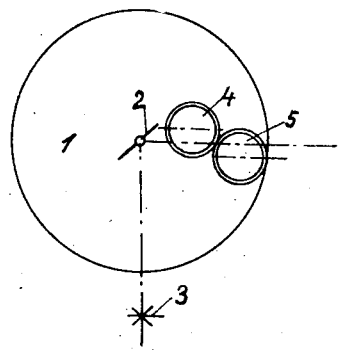
Fig. 3 shows a modified form of a compass adapted for the scope of the invention.

The photo-elements 4, 5 need not be arranged lying next to one another on the same circle of the turnable disk 1, as shown in Figs. 1 and 2, but they may also lie, as shown in Fig. 3, at different distances from the axis of rotation of the disk 1. Essential is only that the two photo-cells are displaced with respect to one another in direction of rotation of the controlling light ray that in a certain position of the light ray the two photo-cells are equally exposed at the same time, whilst in case of deflection of the light ray in the one or the other direction of rotation the lighted surface of the one or other photo-cell is stronger.

Figure 4:
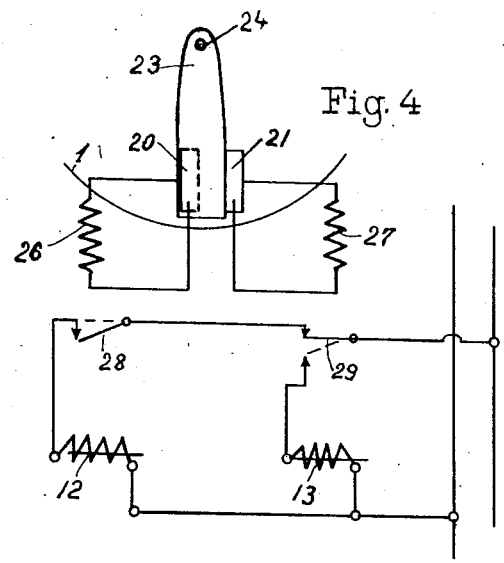
Fig. 4 shows another modified form of a complete wiring of the follow-up device according to the invention.

According to Fig. 4, the controlling of the follow-up system is effected by means of two photo-cells 20, 21, which are arranged at a given distance from each other and lie on the same circle of the adjustable disk 1, and by means of a diaphragm 23 controlling the lighting of the two photo-cells, said diaphragm being rotatable around the axis of rotation 24 of the disk 1. In the starting position the diaphragm 23 entirely covers the photo-cell 20 whilst the photo-cell 21 is entirely exposed by a light source not illustrated. Each of the two photo-cells 20, 21 lie at one winding 26, 27 each of one relay each. The winding 27 of the relay is permanently excited in the starting position of the system and thereby draws up the corresponding armature. The winding 27 with the corresponding relay armature, therefore, represents a closed circuit current relay, whose armature is brought to fall off as soon as the photo-cell 21 is covered in case of deflection of the controlling diaphragm towards the right. On the other hand the winding 26 of the other relay is not excited in the starting position, as in this case the controlling diaphragm 23 completely covers the corresponding photo-cell 20. The corresponding relay armature has, therefore, fallen off in the starting position of the system and is only then drawn up, when the photo-cell 20 is given free in case of deflection of the controlling diaphragm and can excite the relay winding belonging to it. Therefore, the winding 26 with its corresponding relay armature represents an open circuit relay. The controlling of the windings 12, 13 of the follow-up system takes place in a similar manner as illustrated in Fig. 2. Also in this case the contact tongue 29 acting as commutator again lies in series with the controlling contact 28 of the one controlling circuit. In the one position of this commutator 29 the winding 13 of the follow-up system is excited, whereby the controlling circuit of the follow-up system including the winding 12 is interrupted. This commutator is necessary because in case the lighting condition of both photo-cells as compared with the starting position were reversed, both windings 12, 13 of the follow-up system would be simultaneously excited. The manner of operation of this arrangement is the following:

If the diaphragm 23 is deflected towards the left until the open circuit relay 26 is in operation, then the contact 28 is closed and the contact tongue 29 is in the upper position. The winding 12 is switched on so that the follow-up system turns the disk 1 and, therefore, the photo-cells 20, 21 to the left until the starting position is again attained in which the open circuit relay 26 becomes inoperative. If the diaphragm 23 is deflected so far to the right that the reversing of the condition of exposing of the two photo-cells takes place, then in case of drawn up contact 28 the contact tongue 29 is directed downwards through falling off of the relay winding 27. In this manner is achieved on the one part that the controlling circuit 12 is finally interrupted, whilst at the same time the controlling circuit 13 alone remains excited. Therefore, the disk 1 is turned so long to the right, until the starting position is again achieved. In this case the commutator 29 is in its upper position, whilst the contact 28 is opened. If the controlling diaphragm 23 is deflected still further to the right until both photo-cells are fully exposed, then the open circuit relay 26 again effects through closing of the contact 28 in case of also closed upper contact 29 that the photo-cells 20, 21 are correspondingly brought to follow-up.

The controlling diaphragm 23 must be at least so wide that it is able to fully cover one cell and the intermediate space between both cells. Through choice of the distance between both photo-cells a so-called dead zone results, within which the controlling edge of the diaphragm 23 can move without causing a controlling process. The distance between both photo-cells can be adjustable in order to be able to limit the dead zone differently. In this manner may be achieved that the system can move to rest with certainty.

Figure 6:
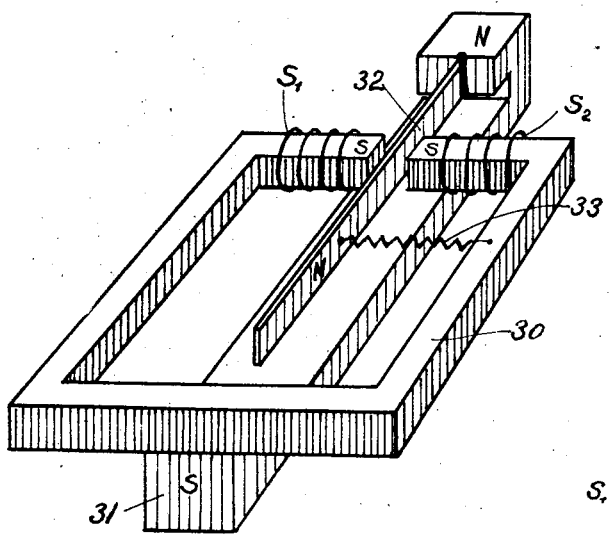
Figs. 5 and 6 show the using of a polarized relay in a follow-up device according to the invention.
Figure 5:
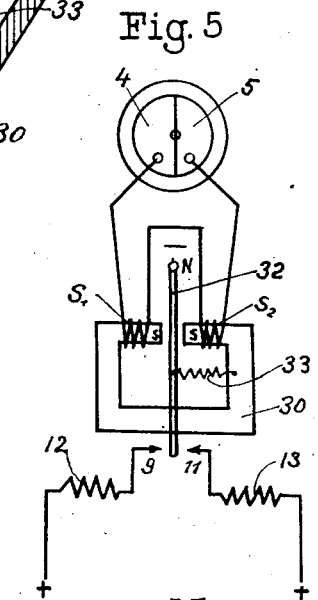

Fig. 5 shows an arrangement for controlling of the follow-up system with the help of a polarized relay, which is excited by two differentially connected photo-cells. 4, 5 are the differentially connected photo-cells, which deliver the exciting current for the two exciting windings $S_1$, $S_2$ of the polarized relay, whose iron core 30 is equally polarized at its free ends by a magnet 31, compare Fig. 6. At the one pole of the polarized magnet 31 an armature 32 is turnably mounted in the manner that it can oscillate between the two pole shoes of the iron core 30. If the exposure of the one or the other photo-cell is stronger, then electromotive forces of variable amplitude and direction result which strengthen the polarity of the iron core 30 created by the magnet 31 on the one free shank of the iron core, respectively, correspondingly weaken it on the other free shank. Under the influence of this strengthening, respectively weakening of the magnetism, the armature 32 is displaced out of its middle position into the one or the other direction. In order to guarantee a starting of the follow-up system also in case of unexposed photo-cells, the armature 32 is pulled by a restoring force (the spring designated with 33 acting as such) into one of its end positions, in which it closes the controlling circuit 13 of the follow-up system over the contact 11. Due to this the photo-cells are brought to follow-up the deflection of the ray until both photo-cells are exposed equally. The exciting is effected in this case in that the free end, lying to the left in the drawing, of the iron core 30 is more strongly magnetized, whilst the free end lying to the right in the drawing is less magnetized. Due to this the armature 32 is deflected towards the left in opposition to the restoring force of the spring 33. The exciting winding $S_1$ is of a greater proportion in this case as the winding $S_2$ that in case of equal exposure of the photo-cells the armature 32 is turned just to its middle position in opposition to the force of the spring 33. In this case the controlling circuits of the follow-up system are switched off so that the follow-up system becomes inoperative. If, for example, the photo-cell 4 is more strongly exposed than the photo-cell 5, then the coil $S_1$ is still more excited and pulls the armature 32 into the left end position, in which it closes the other controlling circuit 12 of the follow-up system over the contact 9. This results in a rotation of the follow-up system in the other direction, whereby the photo-cells 4, 5 are again brought to follow-up until equal exposure of both photo-cells is achieved. On the other hand if the exposure of the photo-cell 5 is stronger, then the magnetizing condition, due to the exciting of coils $S_1$, $S_2$ is reversed and, therefore, supports the influence of the restoring spring 33. The armature 32 reaches the other end position, which effects reversing of the direction of rotation of the follow-up system.

One can also achieve the adjustment of the armature into the middle position in case of equal dimensions of both exciting windings $S_1$, $S_2$ by constructing the left photo-cell larger than the right one, so that the electro-motive force created by the left photo-cell is so much more stronger than that delivered by the right photo-cell that the created fields bring the armature just into its middle position. Furthermore, for exciting the iron core 30 also only one coil can be provided on the middle of same in place of the illustrated two exciting windings at the free ends of the iron core.

Obviously, the present invention is not restricted to the particular embodiments herein shown and described. Moreover, it is not indispensable that all the features of this invention be used conjointly, since they may be employed advantageously in various combinations and subcombinations.

What is claimed is:

1. Apparatus for controlling a motor, comprising means for providing a beam of radiant energy, two devices responsive to said beam for delivering electric energy in response to the activation of the devices by said beam, said devices being rotatable relative to the beam to cause it to activate one or the other device, two relays each comprising first and second electro-magnetic windings, the first windings being fed by the devices with electric energy, the second windings being fed by another source of electric energy, the first winding of each relay cooperating with the corresponding second one for rendering it inoperative upon energization of the first winding, two motor controlling circuits for the right and left turn of the motor, each including an electric contact, each relay actuating one of said contacts for opening or closing, respectively, the control circuits in response to the energization or de-energization of the first relay windings, an auxiliary contact in one of the motor control circuits, one of the relay-actuated contacts directly actuating said auxiliary contact for opening said auxiliary contact as soon as the contact actuating it is closed or reversed, respectively, and follow-up means operable by said motor for relatively changing the position of said device and the incidence of the beam thereon to restore the normal relation between said devices and said beam.

2. Apparatus as claimed in claim 1 in which the first and second winding of each relay electro-magnetically operate in opposition to one another in the manner of a differential relay.

3. Apparatus as claimed in claim 1 in which a third device is provided which is responsive to the beam of radiant energy for the electric energization of the second relay windings.

WOLFGANG MÜLLER.